United States Patent
Lingafelt et al.

(10) Patent No.: US 8,676,923 B2
(45) Date of Patent: Mar. 18, 2014

(54) USE OF DISCOVERY SCANNING AND METHOD OF IP ONLY COMMUNICATION TO IDENTIFY OWNERS AND ADMINISTRATORS OF NETWORK ATTACHED DEVICES

(75) Inventors: Charles Steven Lingafelt, Durham, NC (US); Scott Alex Creeley, St. Louis, MO (US); Charles Victor Jolla, Charlotte, NC (US); Mark Alan Techmeier, Cary, NC (US); Ronald Jerome Walter, Carver, MN (US); Ashley A. Brock, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 2212 days.

(21) Appl. No.: 11/074,517

(22) Filed: Mar. 8, 2005

(65) Prior Publication Data

US 2006/0206593 A1  Sep. 14, 2006

(51) Int. Cl.
*G06F 15/16* (2006.01)
(52) U.S. Cl.
USPC .......................................................... 709/217
(58) Field of Classification Search
USPC .......................................................... 709/217
See application file for complete search history.

(56) References Cited

U.S. PATENT DOCUMENTS

| | | | |
|---|---|---|---|
| 5,768,277 A | 6/1998 | Ohno et al. | 370/457 |
| 5,884,322 A | 3/1999 | Sidhu et al. | 707/200 |
| 5,931,947 A | 8/1999 | Burns et al. | 713/201 |
| 6,223,230 B1 | 4/2001 | Garnett et al. | 710/26 |
| 6,311,217 B1 | 10/2001 | Ehlinger et al. | 709/226 |
| 6,327,266 B1 | 12/2001 | Midani et al. | 370/466 |
| 6,393,478 B1 * | 5/2002 | Bahlmann | 709/224 |
| 6,456,597 B1 | 9/2002 | Bare | 370/252 |
| 6,704,819 B1 | 3/2004 | Chrysanthakopoulos | 710/240 |
| 6,789,118 B1 * | 9/2004 | Rao | 709/225 |
| 2001/0025304 A1 * | 9/2001 | Keith, Jr. | 709/217 |
| 2003/0182182 A1 | 9/2003 | Kocher | 705/12 |
| 2004/0249927 A1 * | 12/2004 | Pezutti | 709/223 |

OTHER PUBLICATIONS

Leveraging IT Asset Management for Improved Business Continuity.
Dieter Gantenbein and Luca Der, Categorizing Computer Assets According to Communication Patterns.
Jana Koehler, Chris Giblin, Dieter Ganterbein, Rainer Hauser, "On Autonomic Computing Architecture".
Dieter Gantenbein, Tracking Assets and Vulnerabilities in Corporate Networks.

* cited by examiner

*Primary Examiner* — Jerry Dennison
(74) *Attorney, Agent, or Firm* — John R. Pivnichny; Law Office of Jim Boice

(57) ABSTRACT

Method, system, and product for remotely communicating with and identifying owners of objects on an IP network by providing a database identifying owners of objects on an IP network, discovery scanning the IP network for logical objects, sending a message to an unlisted logical object requesting a registration action of the recipient, receiving the registration action indicating an owner of the logical object, and updating the database with the received indication of the owner of the object. The method, system, or product may be embodied in a software application (such as an operating system element), a dedicated processor, or a dedicated processor with dedicated code.

27 Claims, 7 Drawing Sheets

US 8,676,923 B2

USE OF DISCOVERY SCANNING AND METHOD OF IP ONLY COMMUNICATION TO IDENTIFY OWNERS AND ADMINISTRATORS OF NETWORK ATTACHED DEVICES

BACKGROUND

1. Field of the Invention

The invention relates to the identification of owners (including administrators) of objects and devices on an IP (Internet Protocol) network.

2. Background of the Invention

As networks have grown in size, capacity, and complexity, the number of TCP/IP network interfaces on objects and devices attached to IP networks has become quite large. Moreover, a device may have multiple network interfaces. It is not unusual to have as many as three quarters of a million to a million or more devices and objects on a network. Moreover, due to normal failures in processes and lapses in attention to detail, a truly comprehensive listing of devices and objects on the network may be unavailable.

One solution to enumerating and inventorying the many devices and objects is a tool that "crawls" a network and attempts to identify devices and objects on the network. However, merely identifying an object and its object type, with its IP address, is not sufficient to completely identify the object, its type, and its owner or administrator.

The task of completely identifying network objects and devices requires databases. As a general rule these databases are generally incomplete and of poor quality, with missing objects and devices and incomplete information. Error rates as high as fifty five percent have been encountered.

Thus, a need exists for an application to locate and communicate with these network objects and devices. These objects and devices typically exist in an environment where they may be identified by, at most, a subset of such logical properties and attributes as IP address, host name, device characteristics, and object attributes. More particularly, a need exists to identify network objects by a device discovery tool, typically an intelligent device discovery tool, and then to identify the owner, administrator, or responsible user of the network object, and to accomplish this without a wall to wall inventory and physical inventories in wiring closets.

SUMMARY

The method, system, and product described herein fills this need to communicate with, and identify the network objects and devices, including the identity of the owner, administrator, or responsible user of the network object. Network objects and devices typically exist in an environment where they may only be identified by, at most, a subset of such logical properties as IP address, host name, device characteristics, and objects attributes. As described herein network objects are discovered by a device discovery tool, typically an intelligent device discovery tool, and then identified as to the owner, administrator, or responsible user of the network object.

Communication with and potential identification of the owner, administrator, or responsible user of a network object or device is accomplished by the method and systems of our invention which remotely communicates with owners of objects on a network, providing a database identifying owners of objects on an IP network. This is accomplished by or following discovery scanning the IP network for logical objects, and thereafter sending a message to an unlisted logical object or device requesting a registration action of the recipient, receiving the registration action indicating an owner of the logical object, and updating the database with the received indication of the owner of the object. The tool or application may be a software application (such as an operating system element), a dedicated processor, or a dedicated processor with dedicated code.

The method, system, and product described herein has the potential to provide a significant dollars savings for the discovery and identification of network objects and devices, determination of additions, deletions, and other changes to the network, and facilitates the ability to broaden the knowledge of the particular network environment. This, in turn, enables reuse of the gathered data by other downstream processes, for example, asset management, contract compliance, predictive maintenance and preventive maintenance management, and the like.

Moreover, the method, system, and product described herein improve system security compliance and posture. This is because the method, system, and product reduces the fraction of unlisted (and possibly unmaintained and attack vulnerable) network objects and devices. One reasons for this is that as time passes, upgrades, modifications, and patches may not be uniformly applied, and these phantom and apparently unassociated upgrades, modifications, and patches become increasingly vulnerable to attack by malicious code.

Implementation of the method, system, and product described herein, and the associated centralization of user, owner, and administrator data, improves efficiency and decreases the possibility of unauthorized data usage. Implementation of the method, system, and product described herein enhances mitigation of network problems and security issues.

BRIEF DESCRIPTION OF THE DRAWINGS

Various examples of the invention are illustrated in the FIGURES appended hereto.

DETAILED DESCRIPTION

As described herein, we provide a method, system, and product for remotely communicating with and potentially identifying owners of objects on a network and providing a database identifying owners of objects on an IP network. This is done with or after discovery scanning the IP network for logical objects, by sending a message to an unlisted logical object requesting a registration action of the recipient, receiving the registration action indicating an owner of the logical object, and updating the database with the received indication of the owner of the object. The method, system, and product described herein may be a software application (such as an operating system element), a dedicated processor, or a dedicated processor with dedicated code.

Figure 1:
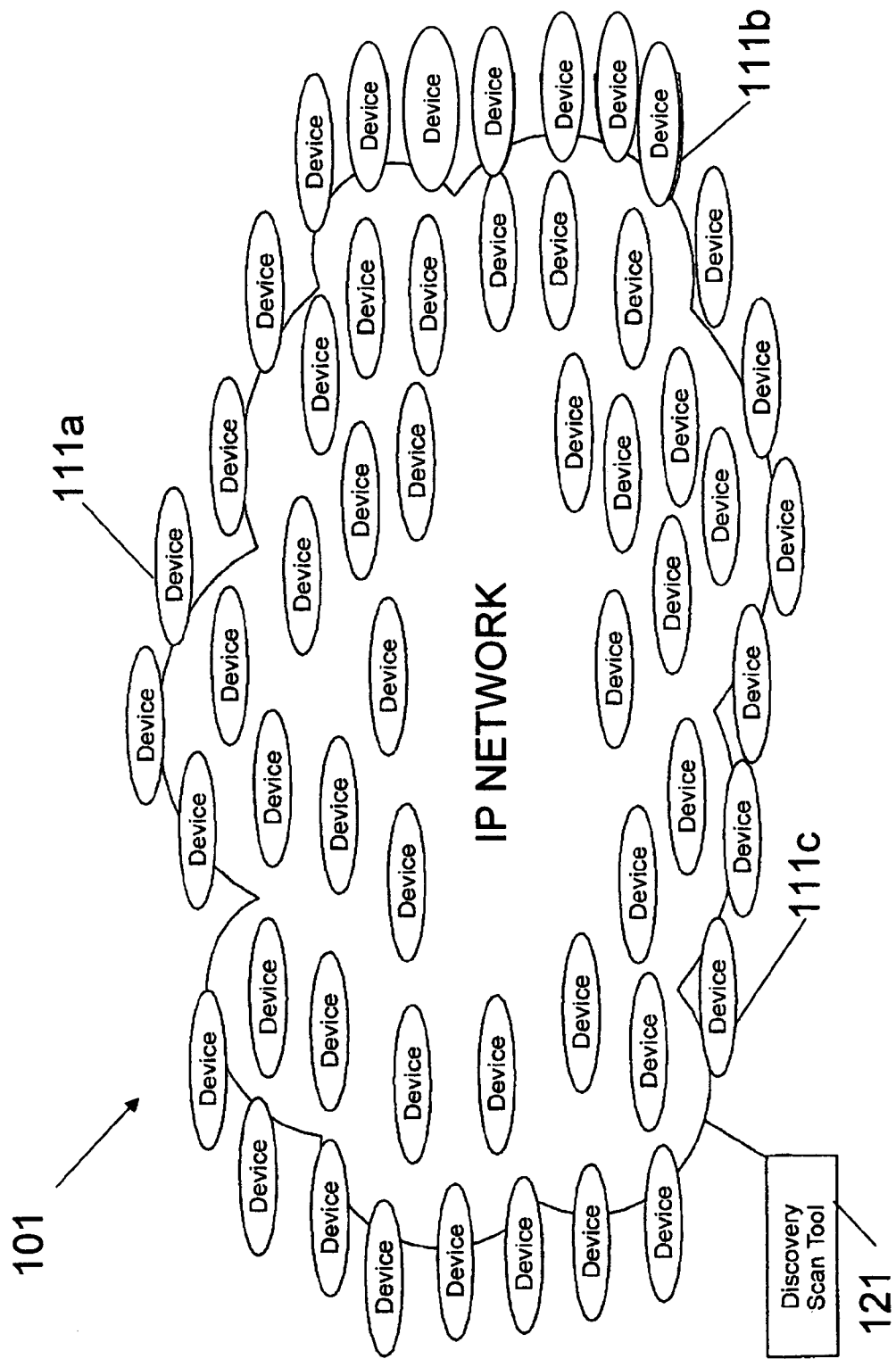
FIG. 1 illustrates an intranet having a plurality of devices and a discovery scan tool.

Within the context of our invention, FIG. 1 illustrates an intranet 101 with numerous network connected network objects 111a, 111b, 111c, and a discovery scan tool, 121. The discovery scan tool 121 may be a device discovery tool, such as a network-based information technology asset discovery and categorization tool. The tool may combine various device discovery, network, and security scanning programs, with data collection, data mining, and distributed automation capabilities in a single application, as exemplified by the IBM Corporation Intelligent Device Discovery ("IDD") application.

Figure 2:
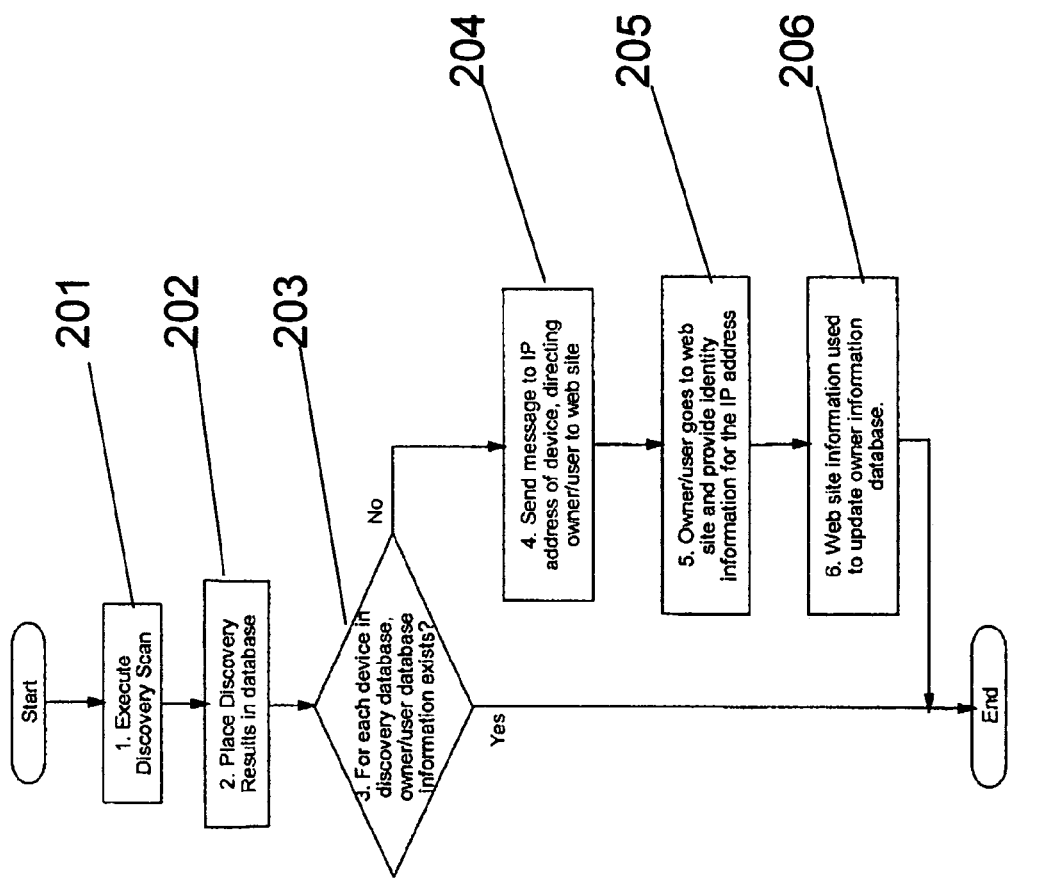
FIG. 2 illustrates a flow chart for carrying out the method of the invention.

FIG. 2 illustrates a process flow for carrying out a method of our invention. As shown in FIG. 2, the network (101 in FIG. 1) is scanned using a device discovery tool 201. The devices that the device discovery tool finds in step 201 are stored in database 202 and compared 203 with the contents of an owner/administrator identification database 202.

If this comparison 203 does not yield a user, a message is sent to the IP address of the device or object directing the device or object owner to a web site 204. This direction may be no more then an e-mail or instant message with a smart link to a database gateway. It is noted that in alternate embodiments, the device or object owner may be directed to a database or other location. This method is not restrictive on the target location, such as a web site.

The recipient of the message, e-mail, or instant message goes to the web site 205, for example by clicking on the link. The web site captures the user's identity 205. This updates the user/owner/administrator database 206.

Figure 3:
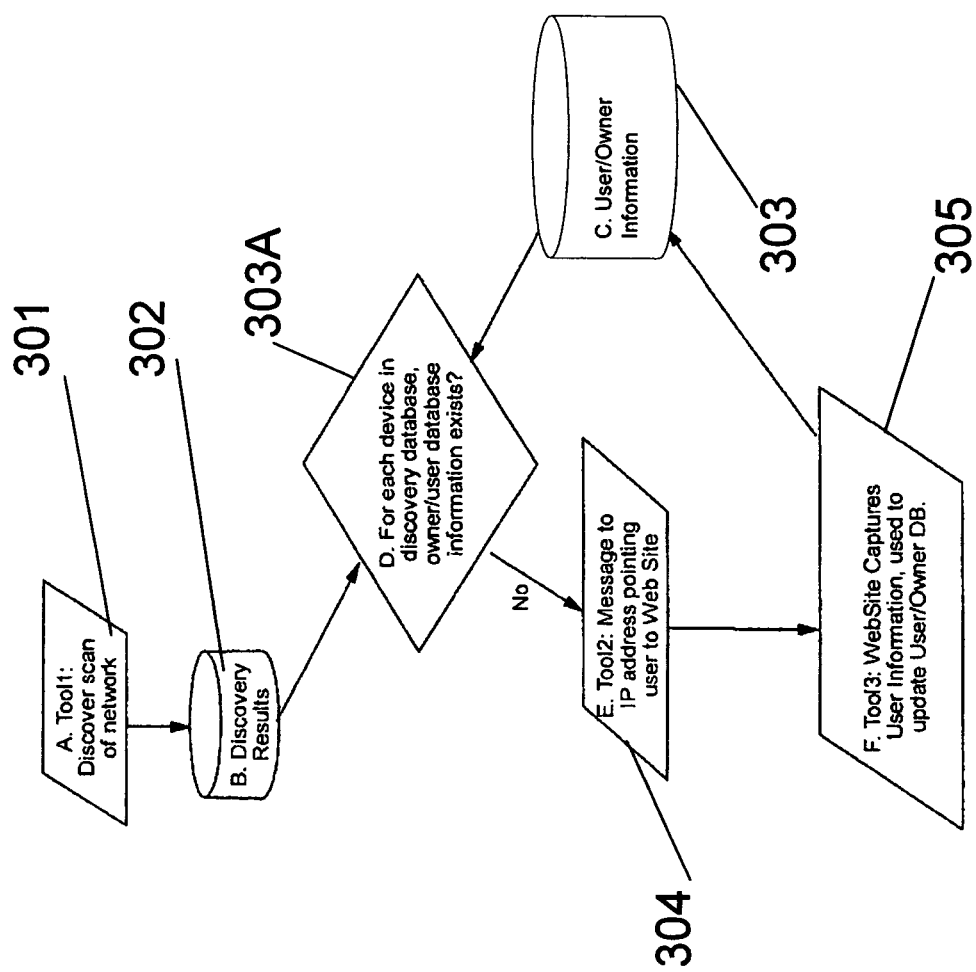
FIG. 3 illustrates a flow chart showing the tools and the steps in which the tools are used to carry out the method of the invention.

The owner/user/administrator databases and associated tools are shown in FIG. 3. As illustrated in FIG. 3 an intelligent device discovery tool 301 (121 in FIG. 1) scans the network (101 in FIG. 1) with the discovery results stored in database 302, where the primary key is the IP address or terms thereof. Available user/owner/administrator information is stored in database 303. Data base 303 is queried 303a for each object or device (111 in FIG. 1) in the network (101 in FIG. 1) to determine if the information is in the database 303.

If the information associated to an object or device is not in database 303, the process shown in FIG. 2 is followed, with a tool 304 as a remote user messaging tool, sending a message pointing the user to a web site. A further tool 305 captures the user information, which is in turn used to update the user/owner/administrator information stored in database 303.

Figure 4:
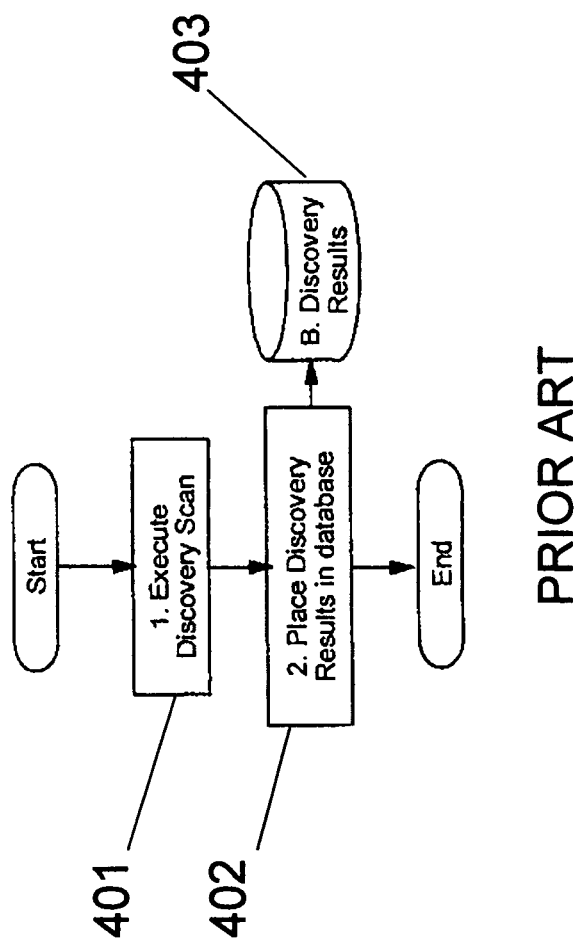
FIG. 4 illustrates a simplified flow chart of the prior art method of detecting and enumerating elements of a network.

FIG. 4, denominated "Prior Art" illustrates one example of the prior art where a discovery scan is executed 401, with the results placed in a discovery results database 402 as "Discovery Results" 403.

Figure 5:
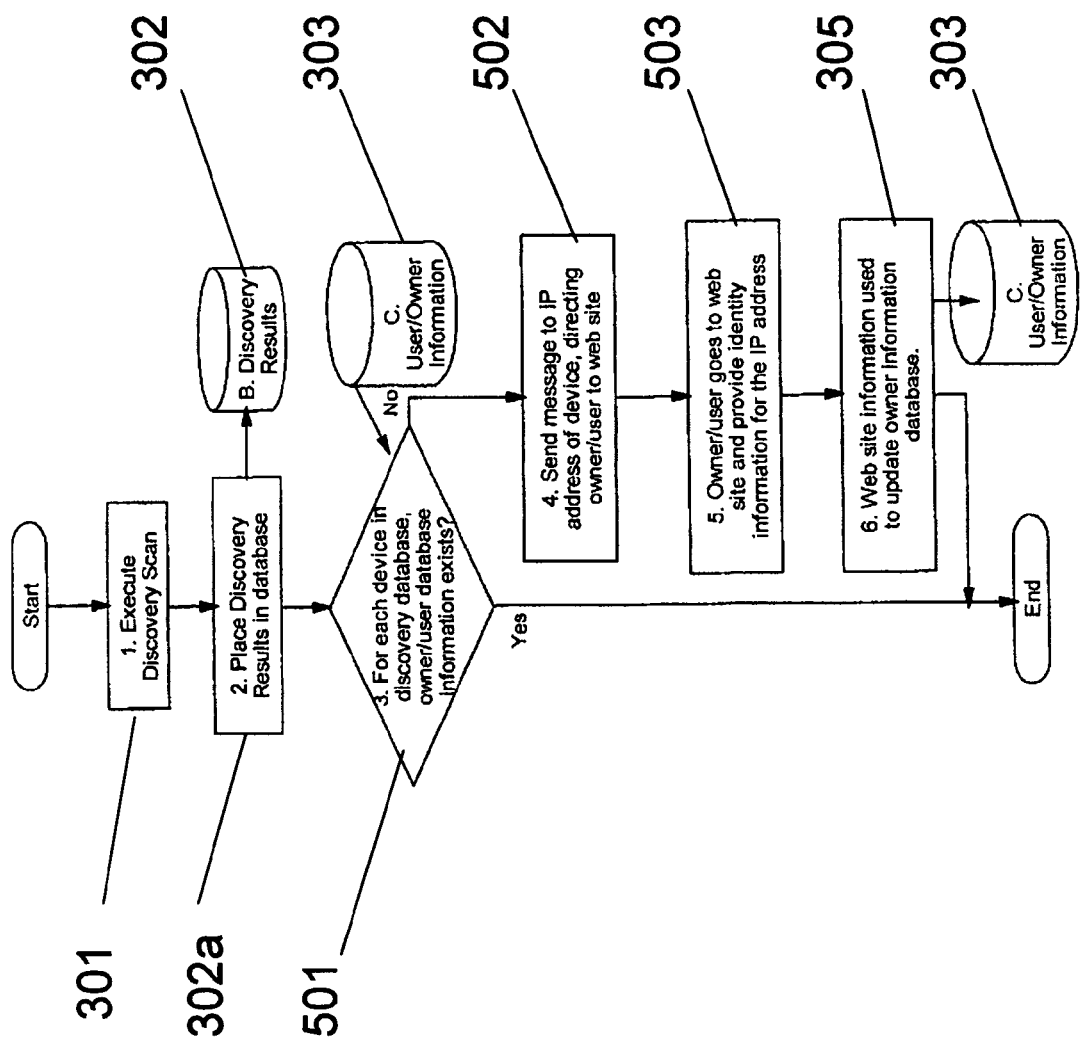
FIG. 5 illustrates a more detailed flowchart of the method of the invention.

FIG. 5 expands on the flow chart of FIG. 3. As illustrated in FIG. 5 an intelligent device discovery tool 301 scans the network (101 in FIG. 1) to execute a discovery scan, with the discovery results stored 302a in database 302, where the primary key is the IP address or terms thereof. Available user/owner/administrator information is stored in database 303. User/owner/administrator data base 303 is queried 501 for each object or device (111 in FIG. 1) in the network (101 in FIG. 1) to determine if the information is in the database 303.

If the information associated to an object or device is not in database 303, the process shown in FIG. 2 is followed, with a tool (304 in FIG. 3) as a remote user messaging tool, sending a message 502 to the IP address of the object or device, pointing the user to a web site. The administrator, owner, or user goes to the web site and provides the identity information associated to the IP address 503. A further tool 305 captures the user information, which is in turn used to update 504 the user/owner/administrator information stored in database 303.

In another situation the information associated to an object or device is dynamic, and the association of the address to an object or device is changing. Frequently a comprehensive enumeration of which IP addresses are dynamic and which are dynamic is not readily available. The result is that if communications are attempted with objects in a dynamically assigned address environment and the address associated to an object has changed, the message will be sent to the wrong object. To address dynamic addressing, our invention provides the capability of verifying that an object using a particular IP address is the same object previously seen on the network. This is done by the comparison of current IP address-host name pair information to prevent an action against the wrong object.

A typical action would be to send a message to an object. A typical message could be, by way of example and not limitation, sending a message such as "Go to URL for additional instructions" or "Your machine is infected with an avian buffer virus, unplug from the network and await instructions" or "Please call the help desk at 111-555-1212 and state that you received this message." The issue is sending a message and not the content of a particular message.

Figure 6:
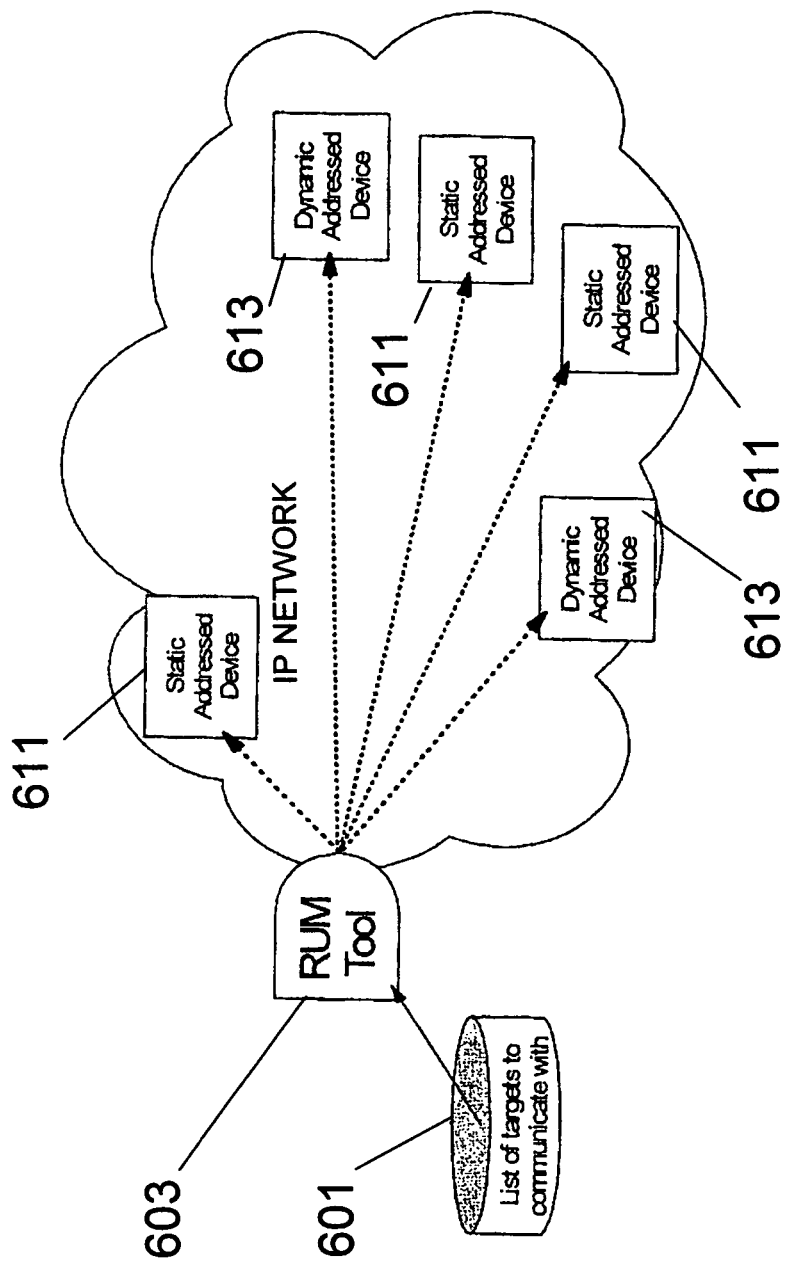
FIG. 6 illustrates a typical usage scenario where a database with a list of targets to communicate with, uses a Remote User Messaging ("RUM") tool and communicates through an intranet with a plurality of static addressed devices and dynamic addressed devices.

FIG. 6 illustrates a typical usage scenario. As shown in FIG. 6 a database 601 with a list of targets to communicate with, using a Remote User Messaging ("RUM") tool 603, communicates through an intranet 605 with a plurality of static addressed devices 611 and dynamic addressed devices 613.

According to an aspect of our invention, verification of the identity of the target devices and objects 611 and 613 is carried out by obtaining the hostname of the object or device and verifying that the name matches the hostname of the device created when the list of IP addresses was created, last verified, or last updated.

The use of the hostname attribute paired with the IP address assures that the IP address association with an object or device is valid in a dynamically addressed environment.

Figure 7:
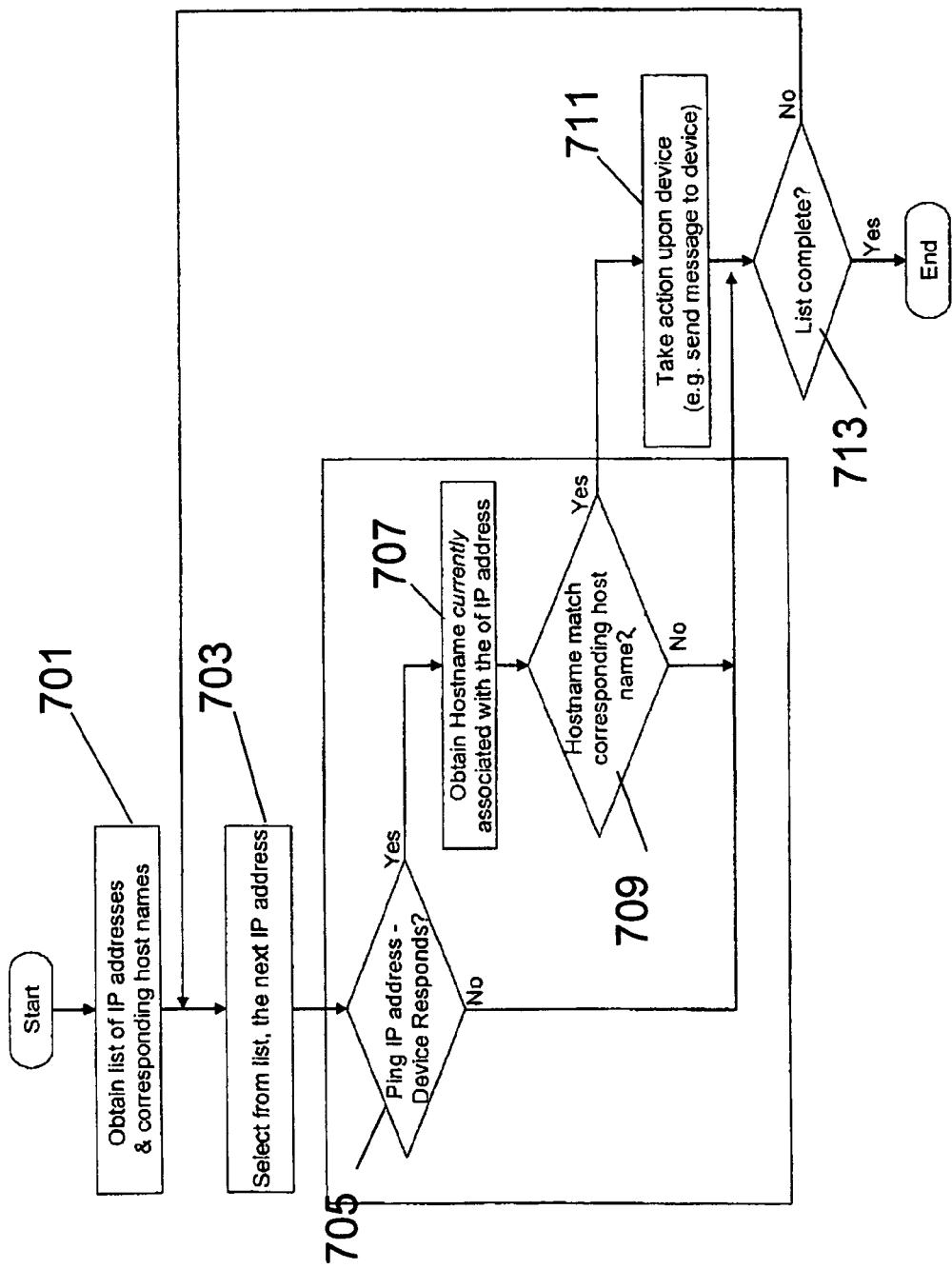
FIG. 7 illustrates flowchart of a further embodiment of the invention where IP addresses are dynamic.

FIG. 7 illustrates one example of the dynamic addressing aspect of our invention. As shown in FIG. 7, a list of the IP addresses and corresponding hostnames is obtained 701. The list is examined 703 and a next IP address is selected from the list. The selected IP address is "pinged" 705. If the selected device or object responds the hostname currently associated with the IP address is obtained 707. If the hostname matches 709 the appropriate action is taken on the object or device 711. The list is checked for completeness 713. If the list is not complete the next IP address is selected 703. If the list is complete the process is terminated 715.

If at the time that the address is pinged 705 the selected object or device does not respond, the list is checked for completeness 713 as described above. If the list is not complete the next IP address is selected 703. If the list is complete the process is terminated 715.

If at the step where the IP address is obtained 707, and the hostname compared, if the hostname does not match 709 the appropriate action is not taken on the object or device 711, and the list is checked for completeness 713. If the list is not complete the next IP address is selected 703. If the list is complete the process is terminated 715.

By the use of the method, system, and product of our invention messages can be sent to objects and devices in which the IP address and hostname of the device or object are known, but no other information is known.

One advantage of the method, system, and product of our invention is that an object's or device's available allocation of resources can be monitored and restricted if necessary. This is the case where flows are observed on a network, and the flow is identifiable by the IP address. If this flow is consuming more then an appropriate amount of network resources it may be desirable to determine the object or device endpoint and take some action at that endpoint. By this aspect of out invention a dynamically assigned address observed in the flow can be correctly associated to the object or device.

A still further advantage of the dynamically address aspect of the invention arises in the case of forced disconnection of the object or device. This is especially the case where an object or device becomes infected with malware, necessitating is disconnection from a network. Where the object or device is dynamically addressed there needs to be the capability of determining if the object or device targeted for disconnection is indeed the offending device.

The invention may be implemented, for example, by having the system for remotely identifying owners of objects on a network providing a database identifying owners of objects on an IP network, by discovery scanning the IP network for logical objects, followed by sending a message to an unlisted logical object requesting a registration action of the recipient, receiving the registration action indicating an owner of the logical object, and updating the database with the received indication of the owner of the object. This may be a software application (such as an operating system element), code running on a dedicated processor, or a dedicated processor with dedicated code.

The code executes a sequence of machine-readable instructions, which can also be referred to as code. These instructions may reside in various types of signal-bearing media. In this respect, one aspect of the present invention concerns a program product, comprising a signal-bearing medium or signal-bearing media tangibly embodying a program of machine-readable instructions executable by a digital processing apparatus to perform a method for remotely identifying owners of objects on a network providing a database identifying owners of objects on an IP network. This may be carried out by a sequence of steps including or following discovery scanning the IP network for logical objects, and simultaneously therewith or thereafter sending a message to an unlisted logical object requesting a registration action of the recipient, receiving the registration action indicating an owner of the logical object, and updating the database with the received indication of the owner of the object. The code may be a software application (such as an operating system element), or code embedded in a dedicated processor, or a dedicated processor with dedicated code.

This signal-bearing medium may comprise, for example, memory in a server. The memory in the server may be non-volatile storage, a data disc, or even memory on a vendor server for downloading to a processor for installation. Alternatively, the instructions may be embodied in a signal-bearing medium such as the optical data storage disc. Alternatively, the instructions may be stored on any of a variety of machine-readable data storage mediums or media, which may include, for example, a "hard drive", a RAID array, a RAMAC, a magnetic data storage diskette (such as a floppy disk), magnetic tape, digital optical tape, RAM, ROM, EPROM, EEPROM, flash memory, magneto-optical storage, paper punch cards, or any other suitable signal-bearing media including transmission media such as digital and/or analog communications links, which may be electrical, optical, and/or wireless. As an example, the machine-readable instructions may comprise software object code, compiled from a language such as "C++", Java, Pascal, ADA, assembler, and the like.

Additionally, the program code may, for example, be compressed, encrypted, or both, and may include executable files, script files and wizards for installation, as in Zip files and cab files. As used herein the term machine-readable instructions or code residing in or on signal-bearing media include all of the above means of delivery.

Other Embodiments

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated.

We claim:

1. A computer-implemented method of remotely identifying owners of hardware devices on an Internet Protocol (IP) network, the method comprising the steps of:
   configuring a specific processor to perform the steps of:
   a) providing a database identifying owners of hardware devices on an IP network;
   b) discovery scanning the IP network to determine a presence of hardware devices on the IP network;
   c) in response to the discovery scanning detecting an unlisted hardware device that is not listed in an owner/administrator identification database, sending a message to the unlisted hardware device requesting an action from the unlisted hardware device, wherein the action identifies an owner of the unlisted hardware device;
   d) receiving the action; and
   e) updating said owner/administrator identification database with a received indication of the owner of the unlisted hardware device.

2. The computer-implemented method of claim 1, wherein the message directs the owner of the unlisted hardware device to a web site, wherein the owner of the unlisted hardware device provides an owner identity of the owner of the unlisted hardware device to the web site, and wherein the owner identity received by the web site is utilized to update the owner/administrator identification database.

3. The computer-implemented method of claim 2, wherein the action further comprises providing an IP address of the unlisted hardware device to the web site.

4. The computer-implemented method of claim 1, wherein hardware devices on the IP network are identified in the owner/administrator identification database according to their respective IP addresses.

5. The computer-implemented method of claim 1, further comprising:
   in response to determining that the unlisted hardware device is consuming more than a pre-determined amount of network resources from the IP network, disconnecting the unlisted hardware device from the IP network.

6. The computer-implemented method of claim 1, wherein the message directs the owner of the unlisted hardware device to place a telephone call to a help desk to provide an identity of the owner to the help desk.

7. The computer-implemented method of claim 1, wherein an IP address associated with the unlisted hardware device is dynamic, said method further comprising verifying that the unlisted hardware device is a same object that has been previously recorded in the owner/administrator identification database.

8. The computer-implemented method of claim 1, wherein the message is an instruction to the owner of the unlisted hardware device to disconnect the unlisted hardware device from the IP network.

9. The computer-implemented method of claim 1, wherein the unlisted hardware device has been assigned an IP address.

10. A system including a computer Internet Protocol (IP) network having a plurality of hardware devices, said IP network being controlled by a computer to perform a method for remotely identifying owners of hardware devices on the network, wherein said computer comprises:
 a central processing unit, a computer readable memory, and a computer readable storage media;
 first program instructions for providing a database identifying owners of hardware devices on an IP network;
 second program instructions for discovery scanning the IP network for hardware devices;
 third program instructions for in response to the discovery scanning detecting an unlisted hardware device that is not listed in an owner/administrator identification database, sending a message to a user of the hardware device requesting an action from the unlisted hardware device, wherein the action identifies an unknown user and owner of the unlisted hardware device;
 fourth program instructions for receiving the action;
 fifth program instructions for updating said owner/administrator identification database with a received indication of the owner of the unlisted hardware device; and wherein
 said first, second, third, fourth and fifth program instructions are stored on said computer readable storage media for execution by said central processing unit via said computer readable memory.

11. The system of claim 10, wherein the message directs the owner of the unlisted hardware device to a web site, wherein the owner of the unlisted hardware device provides an owner identity of the owner of the unlisted hardware device to the web site, and wherein the owner identity received by the web site is utilized to update the owner/administrator identification database.

12. The system of claim 11, wherein the action further comprises providing an IP address for the unlisted hardware device to the web site.

13. The system of claim 10, wherein hardware devices on the IP network are identified in the owner/administrator identification database according to their respective IP addresses.

14. The system of claim 10, wherein an IP address associated with the unlisted hardware device is dynamic, said method further comprising verifying that the unlisted hardware device is a same object that has been previously recorded in the owner/administrator identification database.

15. The system of claim 10, further comprising:
 sixth program instructions for, in response to determining that the unlisted hardware device is consuming more than a pre-determined amount of network resources from the IP network, disconnecting the unlisted hardware device from the IP network.

16. The system of claim 10, wherein the message directs the owner of the unlisted hardware device to place a telephone call to a help desk to provide an identity of the owner to the help desk.

17. The system of claim 14, wherein the message is an instruction to the owner of the unlisted hardware device to disconnect the unlisted hardware device from the IP network.

18. The system of claim 10, wherein the unlisted hardware has been assigned an IP address.

19. A computer-implemented method of providing a business service comprising inventorying hardware devices on an Internet Protocol (IP) network including remotely identifying owners of the hardware devices on the IP network, said computer-implemented method comprising:
 a) providing, by a specific processor, a database identifying owners of hardware devices on an IP network;
 b) discovery scanning, by said specific processor, the IP network for hardware devices that are on the IP network;
 c) in response to the discovery scanning detecting an unlisted hardware device on the IP network that is not listed in an owner/administrator identification database, sending, by said specific processor, a message to the unlisted hardware device requesting an action from the unlisted hardware device, wherein the action identifies an owner of the unlisted hardware device;
 d) receiving, by said specific processor, the action; and
 e) updating, by said specific processor, said owner/administrator identification database with a received indication of the owner of the unlisted hardware device.

20. The computer-implemented method of providing the business service of claim 19, wherein the message directs the owner of the unlisted hardware device to a web site, wherein the owner of the unlisted hardware device. provides an owner identity of the owner of the unlisted hardware device to the web site, and wherein the owner identity received by the web site is utilized to update the owner/administrator identification database.

21. The computer-implemented method of providing the business service of claim 20, wherein the action further comprises providing an IP address for the unlisted hardware device to the web site.

22. The computer-implemented method of providing the business service of claim 19, wherein hardware devices on the IP network are identified in the owner/administrator identification database according to their respective IP addresses.

23. The computer-implemented method of providing the business service of claim 19, wherein an IP address associated with the unlisted hardware device is dynamic, said method further comprising verifying that the unlisted hardware device is a same object that has been previously recorded in the owner/administrator identification database.

24. The computer-implemented method of providing the business service of claim 19, further comprising:
 in response to determining that the unlisted hardware device is consuming more than a pre-determined amount of network resources from the IP network, disconnecting, by instructions executed by said specific processor, the unlisted hardware device from the IP network.

25. The computer-implemented method of providing the business service of claim 19, wherein the message directs the owner of the unlisted hardware device to place a telephone call to a help desk to provide an identity of the owner to the help desk.

26. The computer-implemented method of providing the business service of claim 23, wherein the message is an instruction to the owner of the unlisted hardware device to disconnect the unlisted hardware device from the IP network.

27. The computer-implemented method of providing the business service of claim 19, wherein the unlisted hardware device has been assigned an IP address.

* * * * *